United States Patent
Ramachandran et al.

(10) Patent No.: US 8,893,300 B2
(45) Date of Patent: Nov. 18, 2014

(54) SECURITY SYSTEMS AND METHODS TO REDUCE DATA LEAKS IN ENTERPRISE NETWORKS

(75) Inventors: Anirudh V. Ramachandran, Atlanta, GA (US); Yogesh H. Mundada, Atlanta, GA (US); Muhammad Mukarram Bin Tariq, Atlanta, GA (US); Nicholas G. Feamster, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 235 days.

(21) Appl. No.: 13/237,618

(22) Filed: Sep. 20, 2011

(65) Prior Publication Data

US 2012/0137375 A1 May 31, 2012

Related U.S. Application Data

(60) Provisional application No. 61/384,475, filed on Sep. 20, 2010.

(51) Int. Cl.
H04L 29/06 (2006.01)

(52) U.S. Cl.
USPC ............... 726/28; 726/19; 726/22; 726/23; 726/24; 726/25; 726/27; 707/687

(58) Field of Classification Search
CPC ..... G06F 21/577; G06F 21/554; G06F 21/56; H04L 63/1408; H04L 63/1433; H04L 63/20
USPC ............ 726/19, 22–25, 27, 28; 707/687
See application file for complete search history.

(56) References Cited

U.S. PATENT DOCUMENTS

| 7,167,478 B2 * | 1/2007 | Visweswaraiah | 370/395.4 |
| 7,552,467 B2 * | 6/2009 | Lindsay | 726/5 |
| 7,680,940 B2 * | 3/2010 | Morris | 709/226 |

(Continued)

OTHER PUBLICATIONS

Lewis, Colleen, and Cynthia Sturton, "SHIFT+ M: Software-hardware information flow tracking on multi-core." Dept. Elec. Eng. Comput. Sci., Univ. California Berkeley, Berkeley, Res. Project [Online]. Available: www. eecs. berkeley. edu/~ csturton/classes/cs258/ShiftM Final. pdf (2008).*

(Continued)

*Primary Examiner* — Luu Pham
*Assistant Examiner* — Kari Schmidt
(74) *Attorney, Agent, or Firm* — Troutman Sanders LLP; Ryan A. Schneider; Christopher Close, Jr.

(57) ABSTRACT

Disclosed are embodiments of a security system for reducing data leaks by checking information flows between resources of a network. When an information flow is attempted between a sending resource, which can be anywhere in the network, and a receiving resource residing at a specific host within the network, a host labeler can determine whether information is allowed to flow from the sending resource to the receiving resource. The sending resource and the receiving resource can each have an applicable label, and each label can comprise zero, one, or more taints. For each taint having an active secrecy characteristic in a label of the sending resource, the host labeler can require that there be a matching taint with active secrecy characteristic in the receiving resource. If this condition is not met, the security system can block the information flow between the sending and receiving resources.

16 Claims, 7 Drawing Sheets

(56) References Cited

U.S. PATENT DOCUMENTS

| | | | | |
|---|---|---|---|---|
| 7,788,235 | B1* | 8/2010 | Yeo | 707/687 |
| 8,190,636 | B2* | 5/2012 | Ekberg et al. | 707/783 |
| 8,321,840 | B2* | 11/2012 | Nagarajan et al. | 717/126 |
| 8,356,357 | B1* | 1/2013 | Barile et al. | 726/26 |
| 2004/0122792 | A1* | 6/2004 | Salazar | 707/1 |
| 2009/0300751 | A1* | 12/2009 | Krishnamurthy et al. | 726/13 |
| 2010/0058475 | A1* | 3/2010 | Thummalapenta et al. | 726/25 |
| 2010/0131721 | A1* | 5/2010 | Title et al. | 711/154 |
| 2011/0173693 | A1* | 7/2011 | Wysopal et al. | 726/19 |
| 2011/0197180 | A1* | 8/2011 | Huang et al. | 717/126 |
| 2011/0307951 | A1* | 12/2011 | Yermakov et al. | 726/12 |

OTHER PUBLICATIONS

Kolbitsch et al, "Effective and Efficient Malware Detection at the End Host." USENIX Association. http://dl.acm.org/citation.cfm?id=1855790 (2009).*

Efstathopoulos, Petros, et al. "Labels and event processes in the Asbestos operating system." ACM SIGOPS Operating Systems Review. vol. 39. No. 5. ACM, 2005.*

Xiao-song Zhang; Liu Zhi; Da-peng Chen, "A Practical Taint-Based Malware Detection," Apperceiving Computing and Intelligence Analysis, 2008. ICACIA 2008. International Conference on , vol., no., pp. 73,77, 13-15 Dec. 2008.*

* cited by examiner

SECURITY SYSTEMS AND METHODS TO REDUCE DATA LEAKS IN ENTERPRISE NETWORKS

CROSS-REFERENCE TO RELATED APPLICATIONS

This application claims priority to and the benefit under 35 U.S.C. §119(e) of U.S. Provisional Patent Application No. 61/384,475, filed 20 Sep. 2010, which is incorporated herein by reference in its entirety as if fully set forth below.

GOVERNMENT LICENSE RIGHTS

This invention was made with Government support under Agreement No. CNS-0916732, awarded by the National Science Foundation. The Government has certain rights in this invention.

TECHNICAL FIELD

Various embodiments of the present invention relate to network security and, particularly, to security systems and methods that reduce or prevent data leaks in enterprise networks.

BACKGROUND

Organizations must control where private information spreads and to whom it is accessible; this problem is referred to in the security industry as data loss/leak prevention (DLP). Commercial solutions for DLP are based on scanning content, where the content of traffic flowing outside an organization is compared with patterns of sensitive data (e.g., nine-digit social security numbers) to identify potentially private information. These solutions impose high overhead and are easily evaded, such as by simply encrypting data so that private information is unrecognizable.

Research solutions to the DLP problem require rewriting applications or running custom operating systems, which cause difficulties in deployment for most enterprise environments. These solutions also typically attempt to prevent data loss from a single host, and not across a network, making it challenging to implement a data loss prevention policy for a network of devices.

SUMMARY

There is a pressing need for security systems and methods to reduce or comprehensively prevent the loss of sensitive or confidential data and assets from organizations, even in the face of determined and well-equipped adversaries. Preferably, such security systems and methods must not be easily evaded, for example, by transforming or encrypting sensitive data prior to an attempted leak event. Existing data loss/leak prevention (DLP) systems are overwhelmingly content-based, implying that they can be easily defeated or circumvented through relatively simple and accessible tools. Consequently, various embodiments of this invention are directed towards content-agnostic data loss prevention systems and methods, which are significantly harder to evade, and in addition impose far less overhead than content-based systems.

An exemplary embodiment of such a content-agnostic security system can comprise a labeling system and an enforcement system. Generally, the labeling system can manage security labels for the various sensitive resources or assets within an organization, such as files, processes, memory pages, or database records. Labels have policies (known as capabilities) associated with them that restrict the flow of information from labeled resources. The enforcement system can then control information flows between resources based on the labels and their associated policies.

An exemplary label can comprise a set of taints, where each taint can comprise an identification number, a secrecy bit, and an integrity bit. Each taints can have a capability associated with it that specifies the subset of enterprise users who have permissions to interact with a resource that carries the taint in its label. When the secrecy bit of a taint is set, the associated resource can be deemed secret with respect to that taint, and the security system can control flows of information from the resource to maintain the secrecy of the associated resource conformant to the taint's policy. Similarly, when the integrity bit of a taint is set, the security system can maintain the integrity of the associated resource by limiting information flows into that resource. Each resource can possess one or more of taints in its label, allowing for sophisticated policies to protect sensitive information from leakage as well as tampering.

The enforcement system can require that, for an information flow to occur from a sending resource to a receiving resource, the enterprise user that owns the receiving resource must possess the capability to set the secrecy bit for every taint for which the sending resource has a set secrecy bit. Accordingly, secret data is not shared with a resource for which the owner does not have the capability to read secret data. Additionally, the creator of a secret resource can design a policy that allows a user U the capability to set the secrecy bit for a certain taint while denying the user the ability to unset the bit. This ensures that once U's receiving resource reads a secret resource, it may not be allowed to leak this sensitive information by writing to an external output device (e.g., a USB drive) that has all secrecy bits unset. Similarly, to preserve integrity, the enforcement system can require that the owner of a resource sending data must have the capability to set the integrity bit for every taint in the sending resource for which the receiving resource has a set integrity bit. If these conditions are not met for an attempted information flow, the security system can block the information flow.

This method of preventing data leaks by strictly controlling where sensitive information can flow using resource labels is referred to in prior art as information flow control. Embodiments of the present invention have improvements and benefits over prior art in this area, some of which are as follows: First, the security system can associate capabilities not with resources themselves, but instead with the users who own the resources. This feature allows for unmodified legacy applications to be secured using labels, by making the users that run these applications responsible for policy and capability management. Second, unlike prior information flow control systems, this security system can propagate taints between resources not just on a single computer, but between resources on a network of computers. Third, labels can be applied not just to processes and files, but also to other resources such as database records, memory pages, network sockets, peripheral devices, or the like, allowing arbitrarily fine granularity in controlling the flow of sensitive information. Fourth, the security system can integrate tightly with an enterprise's existing user directories (e.g., Microsoft Active Directory), allowing enterprise users to easily set and change policies on the resources that they own. Fourth, to ensure that a sensitive resource can be taken out of the enterprise only by an authorized user, the security system can require that the user first unset the secrecy bits from all taints in the resource and, in some embodiments, additionally complete a "proofof-human" challenge, such as a CAPTCHA (Completely Automated Public Turing test to tell Computers and Humans Apart), thereby preventing malicious programs masquerading as an authorized user from leaking sensitive information.

These and other objects, features, and advantages of the security system will become more apparent upon reading the following specification in conjunction with the accompanying drawing figures.

DETAILED DESCRIPTION

Figure 1:
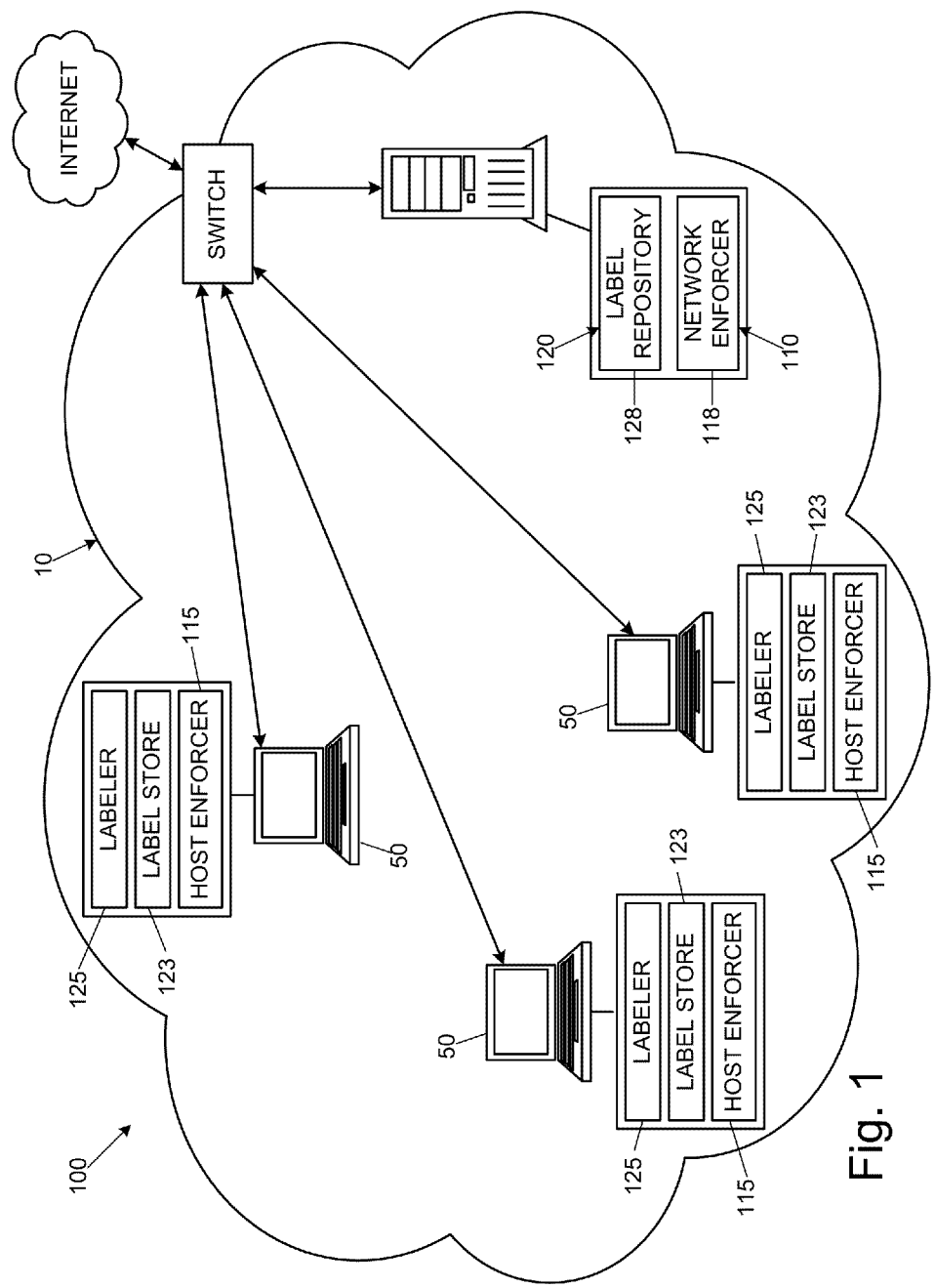
FIG. 1 illustrates a security system operating within an enterprise network, according to an exemplary embodiment of the present invention.

To facilitate an understanding of the principles and features of the invention, various illustrative embodiments are explained below. In particular, the invention is described in the context of being a security system for reducing data leaks in an enterprise networks. Embodiments of the invention, however, need not be limited to protecting an organization against data leaks. Rather, various embodiments of the invention can be used to manage data permissions within an organizational network, to enable comprehensive tracking and auditing of sensitive data access and use, to protect sensitive data accessed from outside an enterprise network through a potentially untrusted web-based application, and can be used in networks other than enterprise networks.

The components described hereinafter as making up various elements of the invention are intended to be illustrative and not restrictive. Many suitable components that can perform the same or similar functions as components described herein are intended to be embraced within the scope of the invention. Such other components not described herein can include, but are not limited to, similar or analogous components developed after development of the invention.

Various embodiments of the present invention are security systems to reduce data leaks in enterprise networks. An exemplary embodiment of the security system can enforce information flow control across a network for legacy applications. The security system can enable users, such as regular users or administrators of an enterprise, to associate labels with various resources of an enterprise network. Such resources can comprise, for example, files, processes, or database records. Labels can be associated with policies, which can place restrictions on communication to or from resources with a particular label. A labeler module on each host within the network can use the label to determine what communication can take place between labeled resources on the host. When a first resource (e.g., a process) attempts to communicate across the network with a second resource on a different host, the security system can track the flow of information over the network using labels associated with network traffic. The labels can be used to enforce information flow policies, such as on an intermediate network device (e.g., a network enforcer) or on the host that is the intended recipient of the traffic. By enabling information flow control between networked hosts, the security system can also operate in networks with heterogeneous devices and operating systems.

An exemplary embodiment of the security system separates control operations (e.g., determining whether data may be forwarded) from data operations (e.g., forwarding data and associated labels). As a result, embodiments of the present invention provide various benefits over other information flow control systems. For example, the security system can be uniquely able to perform information flow control for unmodified legacy applications in heterogeneous environments due to its novel capability system, which can allow enterprise users to control secrecy and integrity capabilities for their own data. The security system can perform information flow control across a network of hosts running commodity operating systems and unmodified applications, where prior research required all hosts to run a specialized operating system. The security system can also be simple and easily manageable, in that users can specify information flow policies for their own data, which policies can be centrally managed.

A particular exemplary embodiment of the security system operates in the context of web-based applications that are used to access sensitive database records by users external to the enterprise network. In this embodiment, when a user external to the enterprise network requests his or her sensitive database records, the security system can use information flow control to propagate the label on the user's database records across processing or transformation applied on the data by a potentially untrusted or vulnerable web application. The capability on the label can specify that the information flow outside the enterprise is permitted only to the user who owns the label, identified using his or her enterprise authentication credentials. Thus, to retrieve this data from a location external to the enterprise network, the user merely authenticates himself to the enterprise authentication service, which, in coordination with the network enforcer, can enforce information flow between the web application and the public Internet. This embodiment can prevents hacker or malicious web application components from reading a user's sensitive data and sending it out to an unauthorized Internet location.

Referring now to the figures, in which like reference numerals represent like parts throughout the views, various embodiment of the security system will be described in detail.

Overview of the Security System

FIG. 1 illustrates the security system 100 operating within an enterprise network 10, according to an exemplary embodiment of the present invention. As shown in FIG. 1, the security system can operate in an enterprise network comprising a plurality of hosts 50. An exemplary embodiment of the security system 100 can comprise an enforcement system 110 and a labeling system 120. The labeling system 120 can manage labels of various resources of the hosts 50. A capability database 430 (FIG. 4) can manage the capabilities of various enterprise users with respect to the labels on their resources. The enforcement system 110 can be in communication with the hosts 50 and can control how data transactions are handled at each host 50 and between the hosts 50, so as to enforce the data labels.

The labeling system 120 can comprise a label repository 128, one or more labelers 125, and one or more local label stores 123. The labeling system 120 can be distributed across the plurality of hosts, such that a labeler 125 of the labeling system 120 operates on each host 50, and a local label store 123 resides on each host. Each labeler 125 can run independently on its associated host 50 in communication with the local label store 123, and the labeler 125 can label data on that host in accordance with security policies and user instructions. In an exemplary embodiment, the local label store 123 is an in-memory structure that is buffered on disk and maintains the labels of some or all active and persistent resources on the host 50, such as running processes and files. The local label store 123 can exist to speed up label-related operations on hosts 50 by caching labels of active or persistent resources.

The label repository 128 can be located at a central location and can be in communication with the various labelers 125. For example, the label repository 128 can be a computing device distinct from the various hosts 50. The labelers 125 can periodically, or on demand, push updated labels from the local label stores 123 to the label repository 128. As a result, the label repository 128 can maintain a list of labels for resources throughout the network 10.

In addition to storing labels of resources on various hosts 50 in the enterprise network 10, the labeling system 120 can also be responsible for storing capabilities associated with labels through the capability database 430, including, but not limited to, the various types of permissions enterprise users may have with respect to the taints carried by each label. The capability database 430 of the labeling system 120 will be explained in more detail in a later section.

Through the labeling system 120, the security system 100 can track and control the propagation of labels. Users of the security system 100 can apply labels to one or a plurality of resources in the enterprise network 10. Each resource to which a label is applied can be, for example, a file or a process within the network 10. As the resources interact with each other within a single host 50, the labeler 125 on host 50 can directly mediate this interaction and enforce information flow checks using a host enforcer 115. If, however, resources on two networked hosts interact, the labeler 125 can use the help of the label repository 128 in order to transfer the label of the sending resource to the receiving resource, so as to enable enforcement to happen at a network location (e.g., at the switch) or at the receiving host enforcer 115.

The flow of information generally occurs from a first resource to a second, receiving resource. "Information flow" refers to how data is transmitted from between resources. For example, when a process writes to a file, then data flows from the process to the file. However, when a process reads from a file, then data flows from the file to the process. One of skill in the art will recognize that data may be transmitted, and therefore "flow," between resources in various manners, and that the above examples are provided for illustrative purposes only.

In an exemplary embodiment of the security system 100, the host 50 of the receiving resource can initiate an information flow check to ensure that the flow of information is permissible. For example, if information in a data transaction flows from a resource P to a resource Q on a single host 50 (e.g., a process writes to a file), the labeler 125 on that host can retrieve the labels for both P and Q before initiating information flow control checks. If P and Q are on different hosts in the network 10 (e.g., a process sends data to a remote server), P's host can automatically push P's label to the label repository 128. Q's host 50 can automatically retrieve P's label from the label repository 128 and then perform any necessary information flow control checks. If the security system 100 determines that the flow is impermissible, then the interactions between the sending resource and the receiving resource can be blocked by the security system 100.

In some embodiments, P's host 50 can avoid pushing P's label to the label repository 128, and instead can directly attach the P's label to the network packets that are sent from P's host 50 to Q's host 50, usually as an optional field in the Internet Protocol "IP OPTIONS" header.

The enforcement system 110 can perform information flow checks. The enforcement system 110 can comprise a network enforcer 118 and, in some embodiments, a plurality of host enforcers 115. Each host enforcer 115 can reside on a host 50. In some embodiments, the host enforcer 115 can be integrated into an operating system, such as in the kernel, of the host 50 on which it resides. The host enforcer 115 reduces information leaks that may occur at the host 50. For example, and not limitation, the host enforcer 115 may block an attempt by a process to write the contents of a confidential file to a removable drive. For each transaction within a single host where the labels of the sender resource P and the receiver resource Q differ, the labeler 125 of the host 50 can query the host enforcer 115 to decide whether an information flow is permitted.

The network enforcer 118 can control the propagation of information from inside the network 10 to outside the network 10. In this case, the permissibility of information flow can be based on the sender's label and on network flow attributes. For example, the network enforcer 118 can prevent traffic flows that may contain secret information, as indicated the by the traffic's label, from reaching insecure networks (e.g., an open wireless network, or the outside Internet).

Structure of Taints and Labels

Figure 2:
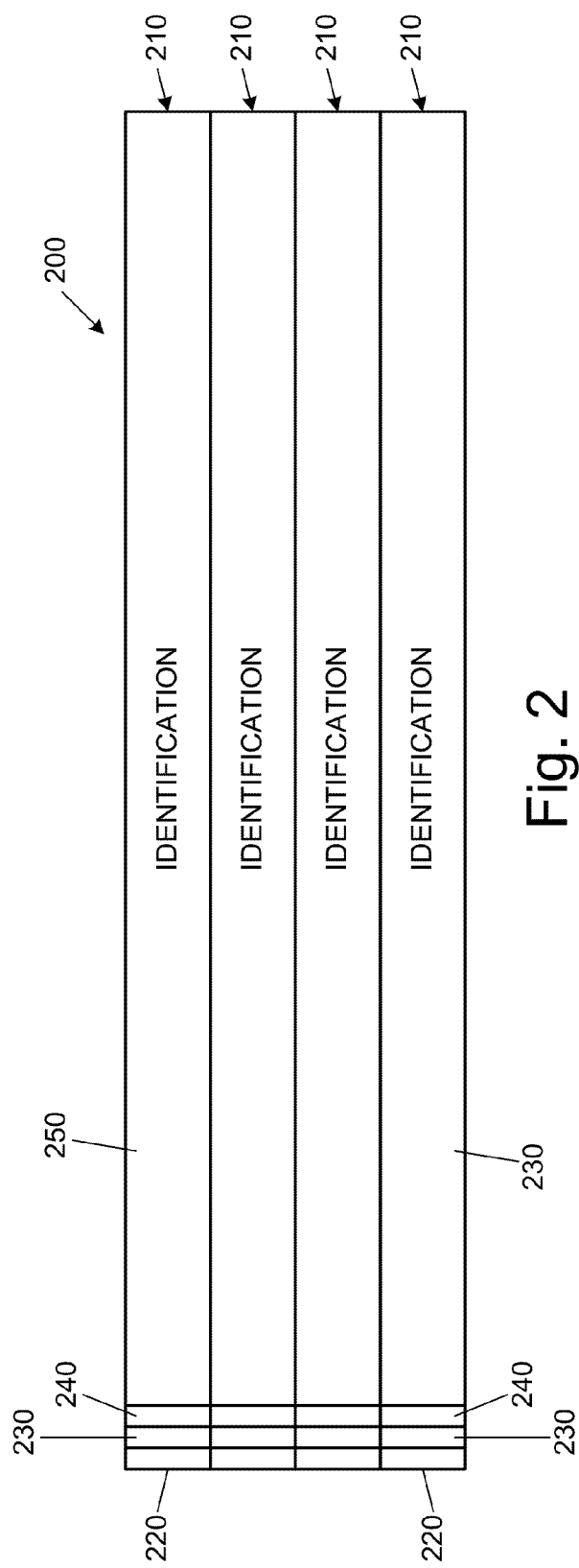
FIG. 2 illustrates a diagram of a typical label of the security system, according to an exemplary embodiment of the present invention.

FIG. 2 illustrates a diagram of a typical label 200 of the security system 100, according to an exemplary embodiment of the present invention. As shown in FIG. 2, each label can comprise one or more taints 210, where each taint relates to a quality of a resource to which the associated label 200 is applied.

In some exemplary embodiments, a taint 210 can be represented as an integer, such as a 64-bit integer. A taint can comprise an identification 250 and a value for each of one or more characteristics. Each characteristic can have at least two possible states, where one of such states is applicable at a given time. For example, and not limitation, a characteristic can be active or inactive, true or false, on or off, set or unset, or 1 or 0. Because a characteristic belongs to the taint 210 of which it is a part, it will be understood that references to a taint 210 being in a particular state (e.g., "a secret taint," "an active taint") throughout this disclosure indicate that a characteristic of the taint 210 is in such particular state.

The characteristics of a taint can include, for example, a secrecy characteristic 220 and an integrity characteristic 230. Each characteristic can be represented in the taint 210 by a Boolean variable, which can be set (i.e., set to "true") or not set (i.e., set to "false"), to indicate whether the characteristic applies to the associated taint 210. For example, and not limitation, a first bit of the taint 210 can represent a secrecy characteristic 220, a second bit can represent an integrity characteristic 230, and the remaining portion of the taint 210 can be an identification 250 of the quality indicated by the taint 210.

In some exemplary embodiments of the security system 100, a particular taint 210 with no characteristics in the set state serves no operational purpose within a label 200. In these exemplary embodiments, if such a taint 210 were removed from the label 200, the effect of the label 200 on its associated resource would be unchanged. Accordingly, throughout this disclosure, references to a label 200 having a particular taint 210 that is unset with respect to some characteristic may include labels 200 lacking the particular taint 210 in question. When a taint 210 is not present, such taint 210 can be deemed to be unset with respect to all characteristics.

If a characteristic of a taint 210 is set, then the resource to which the label 200 applies can require an information flow check when communicating with other resources, so as to insure that the data of that resource is not shared with resources without adequate capabilities. Generally, in an exemplary embodiment, the security system 100 can prevent information flows from resource P to resource Q, if resource P is labeled with a taint 210 having a set secrecy characteristic 220, where resource Q does not have the same taint with a set secrecy characteristic 220. This protects any secret confidential data in resource P from being transferred into resource Q, when Q lacks the same secrecy status. The opposite can be true for the integrity characteristic 230. An information flow can be blocked when the sending resource lacks a set integrity characteristic 230 in a taint for which the receiving resource has a set integrity characteristic 230, thus protecting the integrity of the receiving resource. In some instances where the taint's capability permits, which will be explained in more detail below, the security system 100 can automatically raise the secrecy (i.e., by setting the secrecy characteristic for the applicable taint) or raise the integrity (i.e., by setting the integrity for the applicable taint 210) of the receiving resource, so as to enable the information flow to proceed.

For illustrative purposes, suppose $S_p$ denotes the set of taints in the label 200 of a resource P for which the secrecy characteristic 220 is set, and suppose $I_p$ denotes the set of taints of the same label 200 that have the integrity bit set. If any secrecy or integrity characteristic 220 or 230 of a label 200 is set, the labeled resource can require an information flow check before each attempted communication with another resource is allowed. In some exemplary embodiments, the security system 100 can allow information to flow from P to Q only if:

$S_P \subseteq S_Q$ (i.e., $S_P$ is a subset of $S_Q$); and
$I_Q \subseteq I_P$ (i.e., $I_Q$ is a subset of $I_P$).

The rule requiring that $S_P$ be a subset of $S_Q$ is referred to herein as the secrecy rule. The rule requiring that $I_Q$ be a subset of $I_P$ is referred to herein as the integrity rule. It will be understood that, although some exemplary embodiment of the security system 100 require these rules to be met to permit an information flow, other exemplary embodiments can enforce a different set of rules.

Taints, which can make up the labels, can be initially set up by users of the security system 100. Whether the security system 100 allows a user to create a new taint or modify an existing label 200 with a specific taint can depend on the assigned capabilities of the user with respect to the taint 210 in question.

Taint Capabilities

Figure 3:
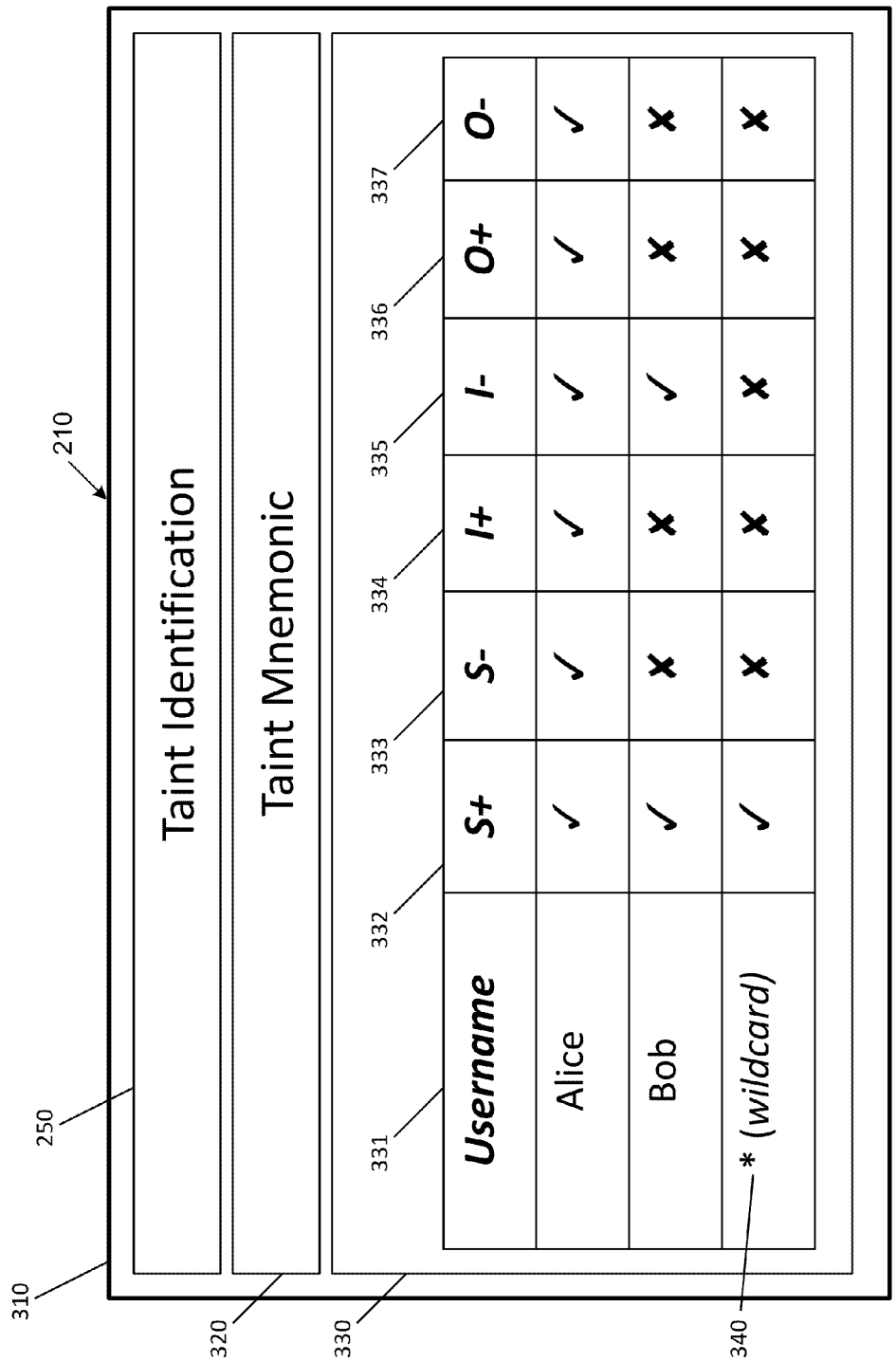
FIG. 3 illustrates a typical capability setting for an exemplary taint, according to an exemplary embodiment of the present invention.

FIG. 3 illustrates a typical capability setting 310 for an exemplary taint, according to an exemplary embodiment of the present invention. The taint capability 310 can be maintained for centrally by the capability database 430. The host enforcer 115 and network enforcer 118 can query the capability database 430 when they encounter an information flow between two resources where at least one resource's label possesses the taint 210 in question. The taint capability 310 can comprise the taint identification 250, a taint mnemonic 320 that is used by lay enterprise users to denote taint identification 250, and a capability table 330 that denotes the capabilities of enterprise users with respect to the taint 210.

The taint mnemonic 320 can be a string or phrase that is assigned to the taint 210 by the user that originally creates the taint, preferably chosen so that it is easy to memorize. For example, and not limitation, if the taint 210 is used to protect sensitive data pertaining to employee salary reports, the user that creates the taint can assign the taint mnemonic 320 as "Salary Reports."

The capability table 330 can be a dynamic table that denotes the capability of each enterprise user in two cases: (1) when a resource owned by the user possesses the taint 210 in its own label and attempts to interact with other resources, or (2) when a resource owned by the user interacts with another resource that possesses the taint 210 in its label. The capability table 330 can include, but is not limited to, a list of usernames 331 and their capabilities 332-337 with respect to the taint identification 210.

Each user of the network can have, but is not limited to, zero, one, or more of various capabilities with respect to each taint 210. For each taint, available capabilities can include the following:

1. Capability to set the secrecy characteristic (s+ 332);
2. Capability to unset the secrecy characteristic (s− 333);
3. Capability to set the integrity characteristic (i+ 334);
4. Capability to unset the integrity characteristic (i− 335);
5. Capability to add users who can make modifications to the taint capability 310 (o+ 336); and
6. Capability to remove users who can make modifications to the taint capability 310 (o− 337).

The user who creates a particular taint 210 can automatically have all six capabilities with respect to the taint 210. When a new user is added to those who can manage the taint 210, the new user can automatically be granted a subset of the capabilities. For example, and not limitation, let enterprise user Alice be a user who creates a particular taint 210; consequently, she can receive all capabilities 332-337 for the taint 210, denoted by check marks (✓) in the capability table 330 corresponding to Alice's row. Because Alice possesses the o+ capability, she may add a user, Bob, to the capability table, allowing him only the capability for s+ and i−, denying him s−, i+, o+, and o−, as denoted by cross marks (x) in the capability table 330 corresponding to Bob's row.

In addition, the capability table 330 can also have a wildcard user entry 340 that can be used to denote permissions toward users not explicitly named in the capability table 330. The wildcard capability setting can be used by the owner(s) of the taint 210 to automatically set permissions for other enterprise users. For example, Alice could set the s+ capability alone for the wildcard user to allow other enterprise users to access and read data from a resource that possesses the taint 210, but deny these users from leaking any sensitive information from the resource after they have read it. The utility of various fields in the capability table 330 will become apparent in the following sections, which discuss host enforcers 115 and network enforcer 118.

One of skill in the art will recognize that the representations of the capability table 330 is exemplary, and actual implementations may involve analogous or extended representations for storing capabilities of users with respect to taint identification 250.

Creating and Applying Taints to Resources

Figure 4:
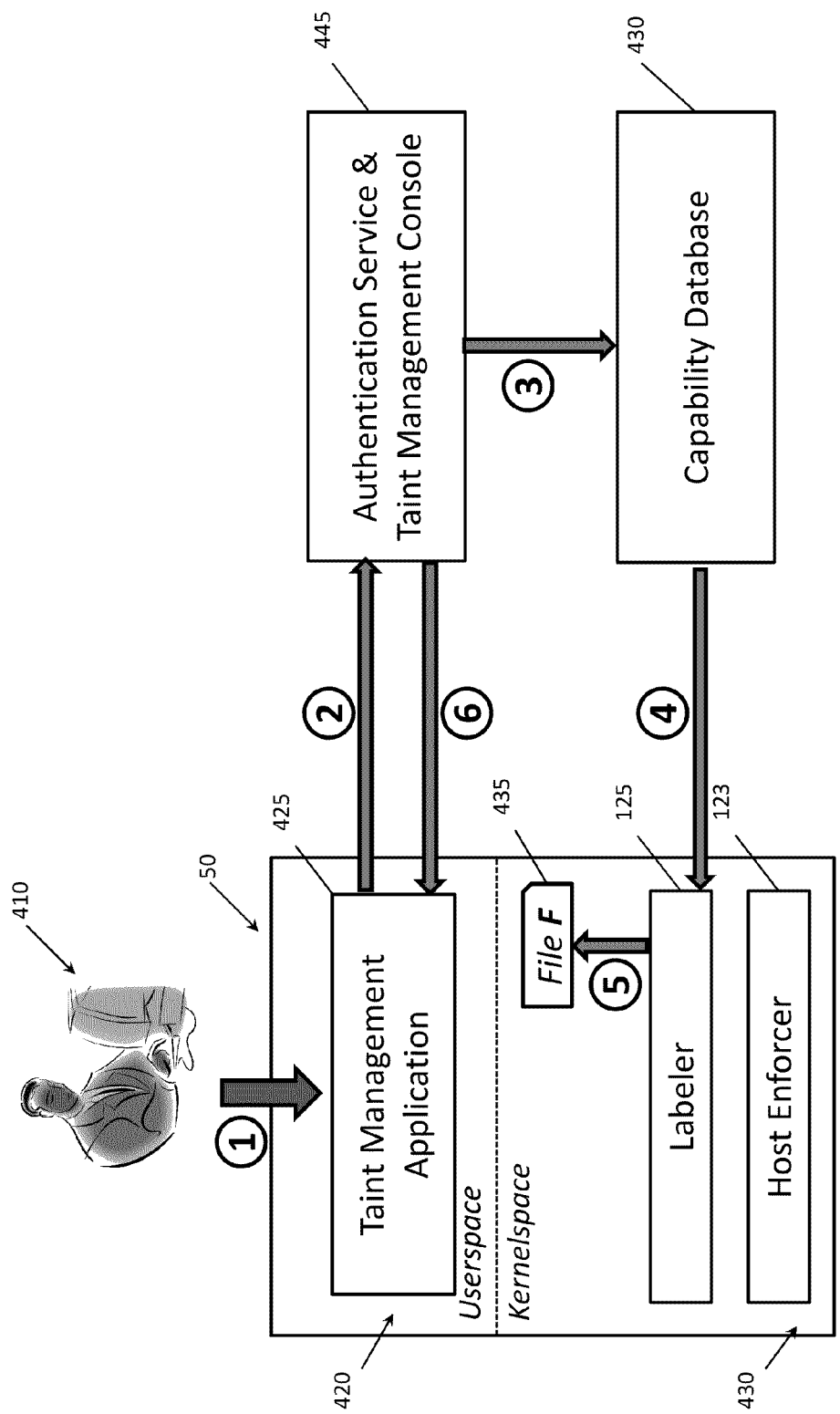
FIG. 4 illustrates a workflow involved in creating a new taint and securely applying the taint to a resource in the enterprise network, according to an exemplary embodiment of the present invention.

FIG. 4 illustrates a workflow involved in creating a new taint and securely applying the taint to a resource in the enterprise network, according to an exemplary embodiment of the present invention. An enterprise user 410 may use an enterprise host 50 to create and apply a taint 210 to a file F 435, in this workflow. The host 50 may run an operating system that can typically be partitioned into programs running in userspace 420 and kernel space 430. Within the context of the security system 100, accesses to the file F 435 can be mediated by the labeler 125, in coordination with the host enforcer 123 and the capability database 430.

In an exemplary embodiment of the security system 100, a user 410 does not have direct access to labels associated with the various resources of the host 50. To protect a file F 435, using the security system, the user 410 may be required to use a centralized authentication service and taint management console 445. Step 1 in protecting file F 435 can be to use a taint management application 425 running in userspace 420 on host 50 to choose a file F 435 to which a taint 210 is to be created and applied. The taint management application 425 can be various programs that can communicate with the authentication service and taint management console 445. For example, and not limitation, the user 410 can use a web browser for this purpose. Alternatively, the user 410 can use a desktop service to communicate with authentication service and taint management console 445, which can be invoked by accessing familiar permissions menus, e.g., by "right-clicking" a file and choosing "File Properties."

The taint management application 425 can communicate the user's taint management request on behalf of the user to the authentication service and taint management console 445, as illustrated in Step 2. The request can comprise, without limitation, the following information: (1) the credentials (e.g., a login username, password, and optionally a CAPTCHA test to distinguish automated requests); (2) the identification of the file F 435 or any other resource for which the user wishes to manage labels 200 or taints 210; (3) the type of request, which can be, but is not limited to, one of TAINT_CREATE, TAINT_MODIFY, or TAINT_MANAGE.

The authentication service and taint management console 445 can be a centralized service that can be in communication with a plurality of hosts 50 in the enterprise, the capability database 430 (in order to create and manage capabilities on taints), and an enterprise-wide user directory service, for example, Microsoft Active Directory, OpenLDAP (Lightweight Directory Access Protocol), or Network Information Services (NIS). The authentication service and taint management console 445 can also provide a detailed visual display for each authenticated user 410 that allows him or her to view, create, manage, and modify one or more of the taints owned by the user 410. After the authentication service and taint management console 445 authenticates the user 410, it can accept the remainder of the user's request, which may include an identifier to a resource in the enterprise and a request type. The identifier to the resource can include the host identifier where the resource is located, the access path for the resource, and the type of resource (e.g., file, process, memory page, database record, etc.). For illustration, FIG. 4 illustrates an example in which the resource chosen by the user 410 is a regular file, F 435, located on the user's own host 50.

The user 410 can issue various types of requests. The TAINT_CREATE request may be used by the user 410 to create a new taint 210 with default capabilities, which defaults can place the user 410 as owner of the newly created taint 210 with full capabilities, and no capabilities for other users. This request can carry additional parameters including, but not limited to, the taint mnemonic 320 and a capability table 330. The TAINT_MODIFY request can be used to modify the capabilities of an existing taint that has user 410 listed as an owner (i.e., the o+ and o− capabilities). This request can carry additional parameters that specify the type of modification requested, which may include changing the taint mnemonic 320, adding or removing users to the capability table 330, or changing specific capabilities for one or more users in the capability table 330. The TAINT_MANAGE request can be used for additional commands pertaining to taints, including, but not limited to:

1. Adding the taint to a resource's label: This type of request can add the requested taint to a specified resource's label, provided the user 410 has the required capabilities to perform this action.
2. Adjusting capabilities of taints in a label: If the taint is already present to the specified resource's label, this type of request can set or unset the secrecy or integrity characteristic for that taint, provided the user 410 has the required capabilities as per the capability database 430.
3. Removing a taint from a resource's label: This type of request can remove a taint 210 from a specified resource's label 200, which may imply adjusting capabilities of the selected taint 210 by unsetting both the secrecy and integrity characteristics 220 and 230 from the taint 210 in the specified resource's label 200.

In Step 3 of FIG. 4, the authentication service and taint management console 445 can verify that the specific request issued by the user 410 satisfies the capabilities assigned to the user 410. In Step 4, the capability database 430 can repackage the request and communicate with the labeler 125 on the host 50 where the specified resource, file F 435, is located. In Step 5, the labeler 125 on the host 50 can locate the resource, file F 435, and perform the requested operation on the specified taint 210 on file F's label 200. Depending on the outcome of this action, the labeler 125 can inform the capability database 430 and the authentication service and management console 445 about the success status of the request. In Step 6, the authentication service and taint management console 445 can communicate the success or failure of the user's request back to the user through the taint management application 425.

Enforcement of Labels with Information Flow Checks

Figure 5:
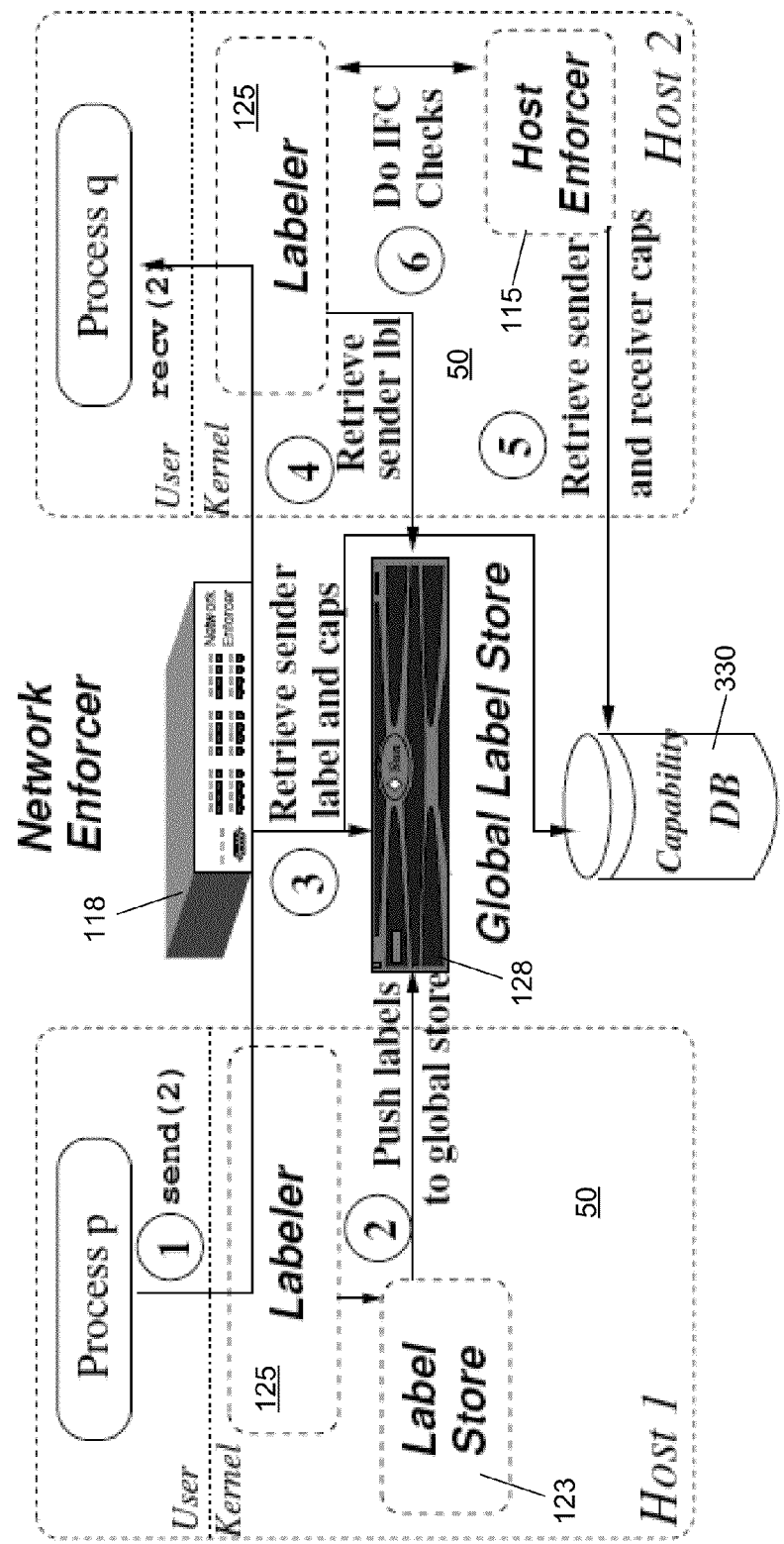
FIG. 5 illustrates information flow between hosts, according to an exemplary embodiment of the present invention.

FIG. 5 illustrates an example of checking information flow within a single host 50, according to an exemplary embodiment of the present invention. It will be understood that this example is provided for illustrative purposes only and does not restrict the scope of the invention. As shown in FIG. 4, file F and process P reside on the host 50. Process P attempts to read secret File F, which would result in a flow of information from file F to process P.

File F is a secret file (i.e., is labeled with a taint having a set secrecy characteristic). When process P attempts to read F, the labeler 125 retrieves the labels for file F and process P from the local label store 123. The labeler 125 then queries the host enforcer 115 with the labels 200 of F and P to determine whether information from F to P is permissible. The host enforcer 115 retrieves the capabilities of the users that own F and P for all taints in the labels of F and P from the capability database 430, and the hose enforcer 115 then determines whether the attempted information flow would cause a violation of the secrecy rule, the integrity rule, or another information flow rule.

FIG. 5 illustrates an example of checking information flow between two resources on different hosts 50 across the network 10, according to an exemplary embodiment of the present invention. As shown in FIG. 5, suppose a malicious process P on a first host 50 attempts to exploit a trusted server process Q on a second host 50. Because the attempted information flow requires P's data to be transmitted over the network 10, the labeler 125 on the first host 50 pushes P's current label 200 to the label repository 128, which can be at a location accessible to the network enforcer 118 and the labeler 125 of the second host 50. The network enforcer 118 can check whether the attributes of the information flow and of P's label 200 permit the attempted information flow to occur. If the network enforcer 118 allows the information flow to reach the second host 50, the labeler 125 of the second host 50 can retrieve P's label 200 from the label repository 128. From this point forward, the security system's operations can be the same or similar to those that would occur from an information flow attempt isolated to a single host 50. The second host's labeler 125 can invoke its host enforcer 115 to perform the information flow check using the respective labels 200 of P and Q. The host enforce 115 can complete this check after retrieving the appropriate user capabilities from the capability database 430.

Preventing Data Leaks

The security system can prevent data leaks using information flow control. Sensitive data that is to be protected from leaks can be associated with a taint 210, T. The user that applies the taint T to the sensitive data may ensure that none but a trusted set of enterprise users are granted the s+ capability on the taint T. Thus, when an unauthorized user not in the set of trusted users attempts to access a file protected with taint T, the host enforcers 115 on the applicable hosts 50 can determine, using the capability database 430, that the information flow to the unauthorized user's program constitutes an unpermitted information flow, and can therefore prevent the operation from taking place.

Now assume that one of the users in the trusted set of users who are granted the s+ capability on taint T is malicious and wishes to leak the sensitive information outside the enterprise network. Such cases would include, for example: (1) the user is benign but is accidentally running a malicious program which attempts to leak the data, or (2) the user is benign, but a service that runs under the user's capability is under the control of a hacker external to the enterprise. Because the user is granted s+, his programs are able to read the sensitive data, and even make copies, some of which may even be encrypted. However, the labeler 125 on the malicious user's host 50 can ensure that all copies of the sensitive data will continue to carry the taint T.

Now suppose the malicious user attempts to copy an encrypted version of the sensitive data to a removable disk drive. The host enforcer 115 on host 50 cam always assign immutable empty labels 200, which carry no taints 210, to each output device that represents a potential data leak. Thus, the host enforcer 115 can understand that writes of sensitive-labeled data to unauthorized output devices, including, for example, removable disk drives, printers, secondary network cards, Bluetooth, and infrared, constitute a violation of information flow control rules, because the label 200 of the output device cannot carry a secret taint 210, even if the user possesses the s+ capability. Thus, the host enforcer 115 can detect a potential data leak and stop the requested transfer from taking place. The malicious user may also be unable to leak sensitive data over the network 10 (e.g., over an encrypted connection to a remote Internet server) because the network data that he sends out can be identified as carrying sensitive content by the network enforcer 118 using the label repository 128, and can therefore be blocked from leaving the network 10. Because the owner of the taint T only granted the malicious user the s+ capability and not the s− capability, the user may be unable to remove the taint T from any of his files that contain sensitive content.

Preventing Data Leaks in Web-Based Applications

An exemplary embodiment of the security system 100 can be used to prevent data leaks in web-based applications that are used to access sensitive data stored in files or database records. Web-based applications may be used by enterprise users to access their sensitive data stored in internal enterprise servers from outside the enterprise. Unfortunately, web-based applications today are a primary vector of data leaks from enterprises and are regularly exploited to leak sensitive database records from organizations. Embodiments of the security system 100 can defend against breaches that exploit web application vulnerabilities while permitting legitimate enterprise users to seamlessly access their sensitive data from outside the enterprise.

Figure 6:
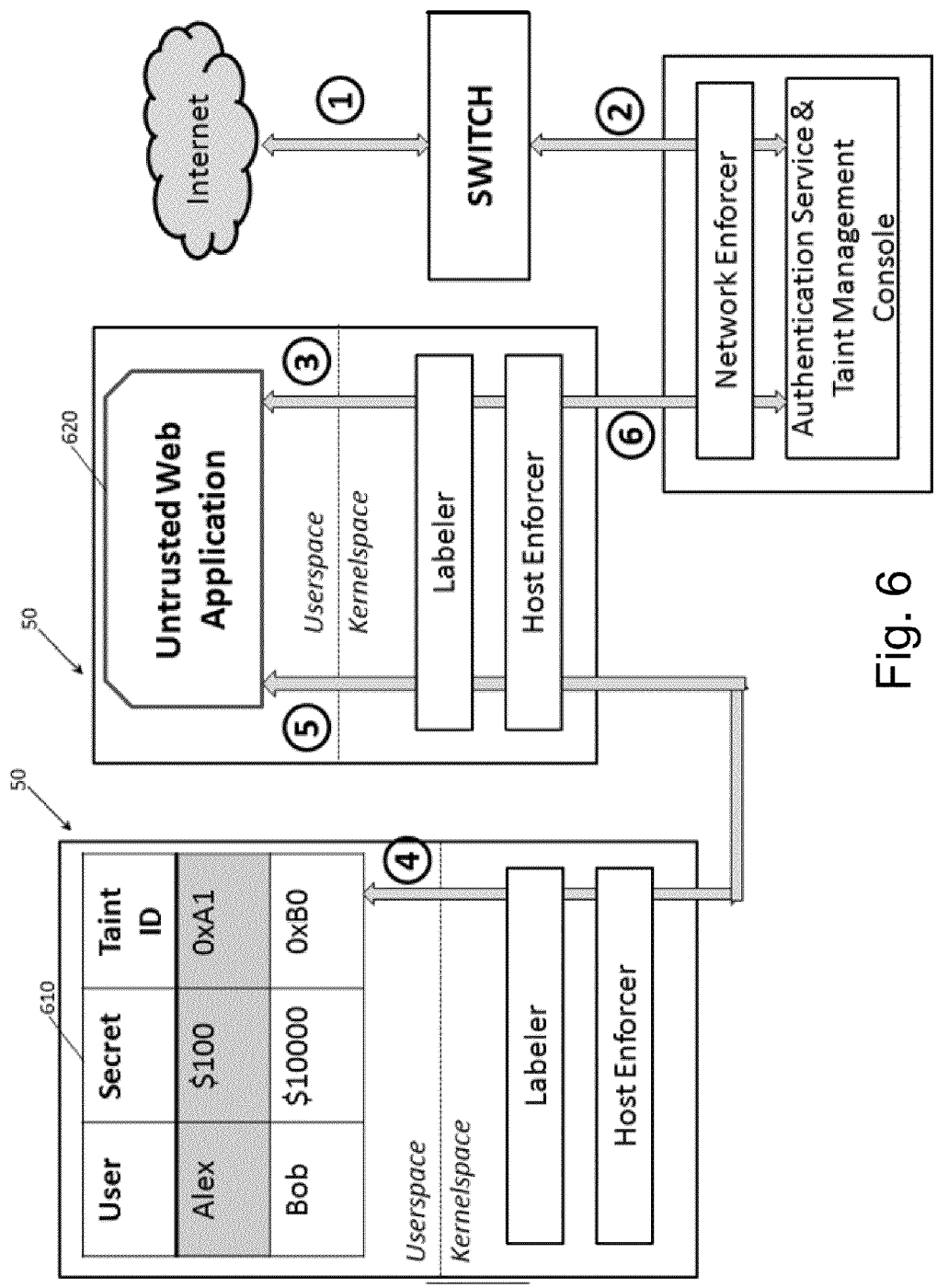
FIG. 6 illustrates the security system being designed to protect a set of sensitive database records accessible through a web-based application, according to an exemplary embodiment of the present invention.

FIG. 6 illustrates an exemplary embodiment of the security system 100 designed to protect a set of sensitive database records accessible through a web-based application 620. It will be understood that various other implementations of the security system 100 may also be used to prevent data leaks through web applications 620, and the implementation provided in FIG. 6 is for illustrative purposes only.

A sensitive database 610 on a host 50 can contain one or more records that are sensitive, with an enterprise user's sensitive data occupying one or more rows of the database 610. For example, and not limitation, the database 610 can include three columns: a user name, a secret (e.g., an account balance), and a taint 210 that is attached to each sensitive record. The database 610 may be accessible to enterprise users from outside the enterprise network 10 through an untrusted web application 620. The web application may be susceptible to compromise by external hackers, or the web application 620 itself may be malicious and attempt to send data it reads from the database 610 to unauthorized destinations outside the network 10. The database 610 and untrusted web application 620 can run on hosts 50 equipped with the labeler 125 and host enforcer 115, positioned within the enterprise network 10 behind the network enforcer 110 and an authentication service and taint management console 445.

This exemplary embodiment of the security system 100 can allow legitimate users to retrieve their secret database records while disallowing hackers, or a malicious web application components, from leaking data. In Step 1, a legitimate user may connect to the web application's Uniform Resource Locator (URL) in order to access the user's secret data. Prior to reaching the web application 620, the user can be redirected to the authentication service and taint management console 445 in Step 2, where the user must authenticate himself by presenting his enterprise credentials. Once authenticated, the user can be redirected to the untrusted web application 620 in Step 3, where the user man request that the web application 620 retrieve his secret account balance from the database 610. In step 4, the web application 620 may issue a retrieve request on behalf of the user for the user's database entry. In Step 5, the requested database record may be released by the database 610 after applying an applicable taint 210 to the data prior to release. This taint 210 can be compared by the host enforcer 110, on either the database server host 50 or the web application server host 50, to ensure that the requesting user has the requisite capability to view the record (e.g., the s+ capability). After receiving the database record, the web application 620 may forward a response to the user through the network enforcer 110. At this stage, in Step 6, the network enforcer 118 can compare the taint 210 on the outgoing data flow with the list of users that are logged in, utilizing the authentication service and taint management console 445 as needed. This step may be crucial to decide whether the user who requested the data has the requisite capability to declassify the data such that it can be sent outside the enterprise network 10 (e.g., the s− capability). After the network enforcer 118 confirms that the tainted network flow is destined to the web session of an authenticated user with the appropriate capability with respect to the taint 210, the network enforcer 118 can automatically declassify the taint 210 to permit the data to leave the enterprise network 10.

Resultantly, the security system 100 can prevent data leaks even if the untrusted web application 620 is compromised in one of many potentially unknown ways. Even if an attacker has complete control over the web application 620 and can read any database record from the database 610 without hindrance, the attacker may be blocked from exporting sensitive data outside the network 10, because the authentication service and taint management console 445 can find that the attacker is attempting to access sensitive information carrying a taint 210 on which the attacker does not have the s− capability.

Improvements Over Prior Art in Information Flow Control

Some aspects of the present invention are related to prior art in information flow control. Specifically, in "A Decentralized Model for Information Flow Control" published in the 1997 Symposium on Operating Systems Principles by Andrew C. Myers and Barbara Liskov, the authors propose a programmatic model to restrict the flow of information between components of applications such that an untrusted application cannot leak it. In "Information Flow Control for Standard OS Abstractions" published in the 2007 Symposium on Operating Systems Principles, Maxwell Krohn et al. propose an information flow control scheme that works on commodity operating systems.

Various embodiments of the present invention include improvements over prior art that can make the present security system 100 more effective, convenient, functional, practical, or cost-effective than the prior art. First, the present invention can perform information flow control for unmodified, legacy applications, whereas the prior art requires applications to be rewritten to take advantage of the information flow control system. In the prior art, applications are required to manage labels and capabilities programmatically and in a decentralized fashion. This approach proves difficult or impossible in most organizations where applications are proprietary and run on commodity operating systems, and modifying source code for such applications is not possible. Embodiments of the present invention need not require application modification, and can work on commodity operating systems. Using a simple and lightweight operating system update that installs the labeler 125, label store 123, and host enforcer 115, the security system 100 can track information flow for unmodified applications by offloading the work of setting and managing policies on labels 200 to the users of the enterprise network 10 through the centralized authentication service and taint management console 445 and the capability database 430.

A second advantage of various embodiments of the present invention is the ability to perform information flow tracking over hosts 50 in a large, globally distributed enterprise network 10, whereas previous inventions in information flow control are limited to a single host or, at the most, to a small number of hosts. In the present invention, the host labelers 125 can coordinate with the label repository 128 to transfer labels 200 between processes communicating over the network 10. A globally distributed enterprise network 10 may have multiple globally distributed label repositories 128 to ensure information flow tracking at a global scale. The label communication scheme works on the existing IP protocol and thus requires no reconfiguration of traffic filtering rules in the enterprise network 10.

A third and major improvement of some embodiments of the present invention is an improvement to the rules of information flow control used in prior art, and improvement that can result in minimal inconvenience for enterprise users when dealing with resources whose labels 200 have one or more taints 210 with the secrecy characteristic 220 set. Typically, in enterprise networks 10, sensitive information is broadly accessible to enterprise employees and users, and the key need for enterprises is not to prevent employees from viewing sensitive data but to prevent them from exfiltrating such data outside the enterprise network confines. In conventional information flow control policy schemes, if a resource P with no taints in its label attempts to read information from a resource Q with one secrecy taint 210, the resource P first has to apply the taint 210 to its own label 200 to raise its own secrecy level, provided the user that owns P possesses the s+ capability on the taint 210; only then can P attempt reading from the resource Q. If the present invention followed standard rules of information flow control, the user that owns P would have to manually apply the taint 210 to P each time P accessed a sensitive resource, even if the user possessed the s+ capability on the taint 210.

To reduce user intervention and to allow newly created processes to read secret files without alerts and warning messages, the security system 100 can modify the conventional rules for information flow control. Specifically, in some embodiments of the security system 100, the labeler 125 can automatically allow information flows that only raise a resource's secrecy (or integrity), provided that the user owning the resource has the s+ capability to the raise the resources's secrecy. Thus, within the enterprise network perimeter protected by the security system 100, users can access sensitive resources as normal, using various programs of their choice, with information flow tracking being transparent to them and their applications.

This novel functionality can be implemented using the wildcard capability 340 in the capability table for a taint 210. At taint creation, the user that creates a taint 210 can choose to set a default wildcard policy for other enterprise users, which can grants other users the s+ capability without granting them the s− capability. This policy can ensure that users other than the creator of the taint 210 can read sensitive resources labeled with the taint 210 but may not remove the taint 210, so as to leak information outside the network 10.

In contrast, lowering secrecy or integrity, such as by unsetting a characteristic from a taint 210, can potentially cause data leaks, and may thus require explicit user action. Removing the secrecy characteristic 220 on a taint 210 for a resource is known as declassification. In some embodiments of the security system 100, declassification may always require user intervention, to confirm that the user wished to declassify a particular resource. In many cases, even if the user who requests declassification possesses the s− capability for the taint 210 in question, the authentication service and taint management console 445 can require the user to solve a CAPTCHA to ensure that the declassification is not requested by an automated malicious program masquerading as the user.

Implementation: Overview

Figure 7:
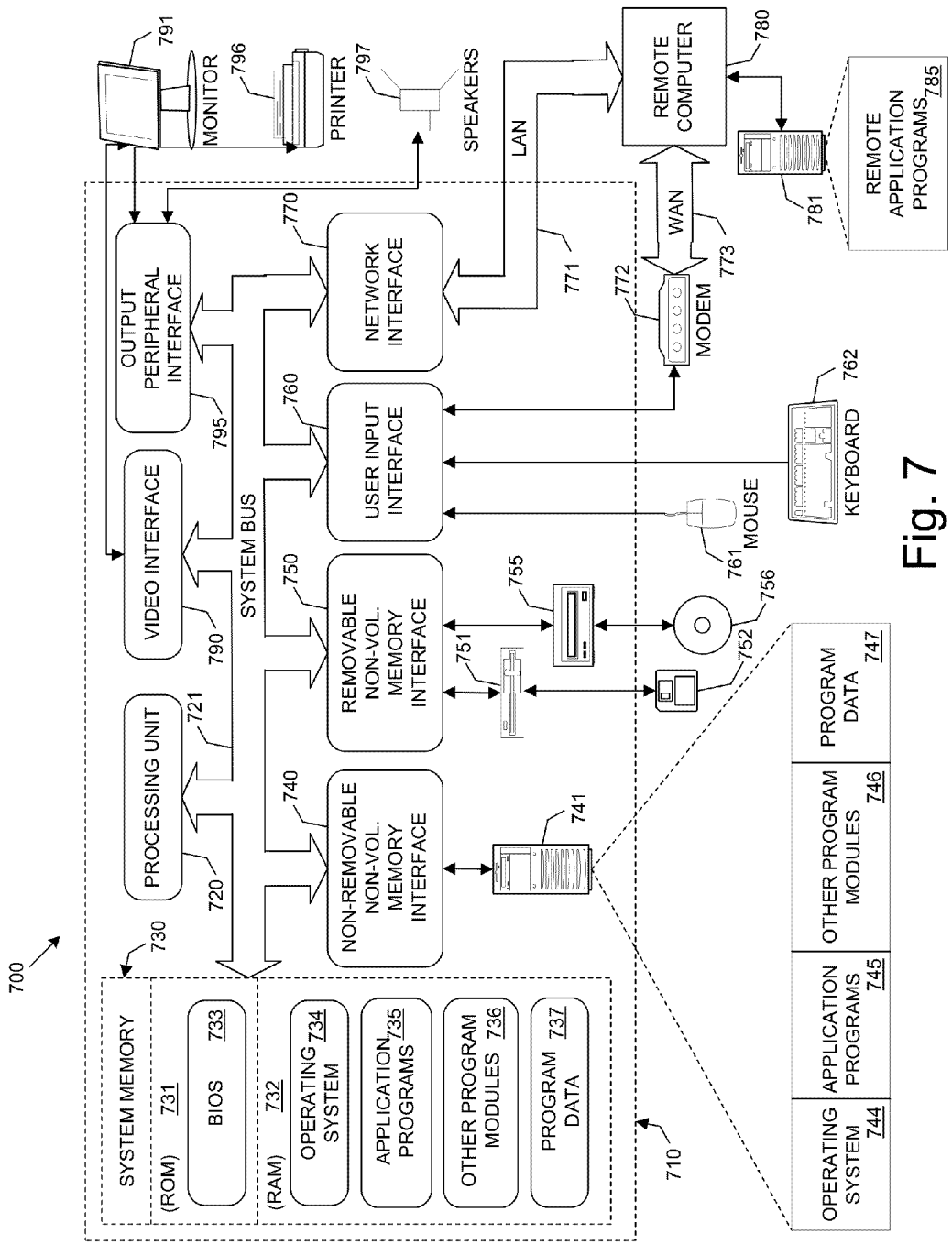
FIG. 7 illustrates an architecture of an exemplary host in the network to which the security system applies, according to an exemplary embodiment of the present invention.

One or more aspects of the security system 100 and related methods can be embodied, in whole or in part, in a computing device 700. For example, one or more hosts 50 can be computing devices, and the network enforcer 118 can be a computing device 700 or a portion thereof. FIG. 7 illustrates an example of a suitable computing device 700 that can be used in the network 10 in which the security system 100 operates, according to an exemplary embodiment of the present invention.

Although specific components of a computing device 700 are illustrated in FIG. 7, the depiction of these components in lieu of others does not limit the scope of the invention. Rather, various types of computing devices 700 can be used to implement embodiments of the security system 100. Exemplary embodiments of the security system 100 can be operational with numerous other general purpose or special purpose computing system environments or configurations. Examples of well-known computing systems, environments, and/or configurations that can be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Exemplary embodiments of the security system 100 can be described in a general context of computer-executable instructions, such as one or more applications or program modules, stored on a computer-readable medium and executed by a computer processing unit. Generally, program modules can include routines, programs, objects, components, or data structures that perform particular tasks or implement particular abstract data types.

With reference to FIG. 7, components of the computing device 700 can comprise, without limitation, a processing unit 720 and a system memory 730. A system bus 721 can couple various system components including the system memory 730 to the processing unit 720.

The computing device 700 can include a variety of computer readable media. Computer-readable media can be any available media that can be accessed by the computing device 700, including both volatile and nonvolatile, removable and non-removable media. For example, and not limitation, computer-readable media can comprise computer storage media and communication media. Computer storage media can include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 700. For example, and not limitation, communication media can include wired media such as a wired network or direct-wired connection, and wireless media such as acoustic, RF, infrared and other wireless media. Combinations of any of the above can also be included within the scope of computer readable media.

The system memory 730 can comprise computer storage media in the form of volatile or nonvolatile memory such as read only memory (ROM) 731 and random access memory (RAM) 732. A basic input/output system 733 (BIOS), containing the basic routines that help to transfer information between elements within the computing device 700, such as during start-up, can typically be stored in the ROM 731. The RAM 732 typically contains data and/or program modules that are immediately accessible to and/or presently in operation by the processing unit 720. For example, and not limitation, FIG. 7 illustrates operating system 734, application programs 735, other program modules 736, and program data 737.

The computing device 700 can also include other removable or non-removable, volatile or nonvolatile computer storage media. By way of example only, FIG. 7 illustrates a hard disk drive 741 that can read from or write to non-removable, nonvolatile magnetic media, a magnetic disk drive 751 for reading or writing to a nonvolatile magnetic disk 752, and an optical disk drive 755 for reading or writing to a nonvolatile optical disk 756, such as a CD ROM or other optical media. Other computer storage media that can be used in the exemplary operating environment can include magnetic tape cassettes, flash memory cards, digital versatile disks, digital video tape, solid state RAM, solid state ROM, and the like. The hard disk drive 741 can be connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 can provide storage of computer readable instructions, data structures, program modules and other data for the computing device 700. For example, hard disk drive 741 is illustrated as storing an operating system 744, application programs 745, other program modules 746, and program data 747. These components can either be the same as or different from operating system 734, application programs 735, other program modules 736, and program data 737.

A web browser application program 735, or web client, can be stored on the hard disk drive 741 or other storage media. The web client 735 can request and render web pages, such as those written in Hypertext Markup Language ("HTML"), in another markup language, or in a scripting language.

A user of the computing device 700 can enter commands and information into the computing device 700 through input devices such as a keyboard 762 and pointing device 761, commonly referred to as a mouse, trackball, or touch pad. Other input devices (not shown) can include a microphone, joystick, game pad, satellite dish, scanner, electronic white board, or the like. These and other input devices are often connected to the processing unit 720 through a user input interface 760 coupled to the system bus 721, but can be connected by other interface and bus structures, such as a parallel port, game port, or a universal serial bus (USB). A monitor 791 or other type of display device can also be connected to the system bus 721 via an interface, such as a video interface 790. In addition to the monitor, the computing device 700 can also include other peripheral output devices such as speakers 797 and a printer 796. These can be connected through an output peripheral interface 795.

The computing device 700 can operate in a networked environment, being in communication with one or more remote computers 780, such as other hosts 50, over the network 10. The remote computer 780 can be a personal computer, a server, a router, a network PC, a peer device, or other common network node, and can include many or all of the elements described above relative to the computing device 700, including a memory storage device 781.

When used in a LAN networking environment, the computing device 700 can be connected to the LAN 771 through a network interface or adapter 770. When used in a WAN networking environment, the computing device 700 can include a modem 772 or other means for establishing communications over the WAN 773, such as the internet. The modem 772, which can be internal or external, can be connected to the system bus 721 via the user input interface 760 or other appropriate mechanism. In a networked environment, program modules depicted relative to the computing device 700 can be stored in the remote memory storage device. For example, and not limitation, FIG. 7 illustrates remote application programs 785 as residing on memory storage device 781. It will be appreciated that the network connections shown are exemplary and other means of establishing a communications link between the computers can be used.

The inventors built a prototype of the security system 100, the details of which are discussed below. It will be understood that the prototype is illustrative of one exemplary embodiment and does not limit the scope of the invention.

Implementation: Host Components

In the prototype security system 100, the labeler 125, the label store 123, and the host enforcer 115 are implemented as an operating system patch for the open source Linux operating system. The labeler 125 is implemented using Linux Security Modules (LSM), which is a framework within the Linux kernel that allows various security models to be added-on without changing core kernel code. LSM provides hooks within system call handlers that can be implemented by a security module. Thus, a third party module can implement mandatory access control for a system call (e.g., read(2)) without changing the core implementation of the system call handler (e.g., sys_read). Using LSM hooks, the labeler 125 intercepts all system calls that transfer information between resources on a host 50. Hooks are used to track information flow for system calls listed in Table 1, which appears below. These are merely exemplary, not limiting, and the security system 100 may track information flow for calls not listed in Table 1 or calls that are added to operating systems in future.

TABLE 1

| Syscall Type | Example syscalls |
| --- | --- |
| Inter-process Communication | send(2), shmat(2), msgsnd(2), kill(2) |
| File/device operations | read(2), unlink(2), mknod(2) |
| Process creation | fork(2), execve(2), clone(2) |
| Memory operations | mmap(2), mprotect(2) |
| Kernel configuration | sysctl(2), init_module |

In addition to hooking system calls that transfer information, the prototype labeler 125 also monitors access to memory pages. Specifically, where the labels 200 are tracked at the granularity of memory pages, and not at the granularity of a process that consists of several memory pages, system calls are not sufficient to track all flow of information between memory pages. For example, and not limitation, a userspace process may have two memory pages mapped into its virtual address space. Suppose that one of such memory pages has a label 210 attached to it while the other memory page does not. If the process executes an instruction in userspace that moves a byte of data from the labeled memory page to the unlabeled memory page, a system call hook at the kernel will be unable to intercept this information flow.

To intercept this information flow from the kernel without placing any trust in the userspace applications, the labeler 125 is augmented with additional functionality. Specifically, the labeler 125 uses hardware-level write protection on memory pages, which is available on all major processor architectures, to be notified whenever there is a write to a memory page. In the example of two memory pages cited above, the labeler 125, at the time of allocating a memory page and mapping it to a process's virtual address space, sets the write-protection on the page if any other pages in the process's address space carry a label 200. This step can ensure that whenever an instruction executing in userspace attempts to copy information to the unlabeled memory page, the write protection can raise a fault, which can be trapped by the labeler 125 residing in the kernel. At this point, the labeler 125 inspects the source and destination of the instruction that caused the trap. In case the source originated from a page that had a label 200, the label 200 is carried over to the write-protected page, and the write protection is removed before allowing the instruction to execute. Otherwise, the write-protect is temporarily removed, the instruction is executed, and the write-protect is re-enabled before returning control back to user-space.

An enterprise administrator installs the labeler 125 module on the operating system of the host 50 when the host is in a known "clean" state (e.g., as might be determined by an audit, virus scanner, or by using a Linux distribution with the pre-loaded labeler for installation). On reboots, the labeler 125 is automatically loaded shortly after initialization (i.e., init) during the boot sequence.

The labeler 125 maintains a label 200 for every resource on the host 50 that is associated with at least one taint 210. Each taint 210 of a label 200 includes an identification, a secrecy bit, and an integrity bit. A taint 210 is described by the taint identification and its current setting of secrecy and integrity bits. The local labeler 125 does not maintain capabilities of the user that owns the resource, as such capabilities are maintained in the central capability database 130. For efficiency, the labeler 125 does not create or maintain labels 200 for files and directories that have no taints in their label 200, instead assigning such resources a "null" label 200.

The local label store 123 is a partition that is encrypted using a key embedded in the kernel image. The local label store 123 is stored in a partition not readable to user space processes (enforced using LSM checks). On disk, labels 200 are indexed by the inode numbers or process identifications of the resources to which they map. Label 200 reads and writes are buffered using an in-memory cache. At shutdown, labels for files and directories are written to disk, and process labels are discarded. To prevent loss of sensitive labels 200 in the event of a machine crash, the prototype security system 100 use a journaling file system on the label store 123 partition. Labels 200 of a file are written back to the label store 123 before the file's inodes themselves are written to disk. Although not required in every embodiment of the security system 100, the label store 123 of the prototype security system 100 back up the labels 200 to the label repository 128 periodically.

The labeler 125 enforces information flow control checks using the host enforcer 115, which is implemented as a kernel patch. Alternatively, the host enforcer 115 can be implemented below the kernel in a hypervisor or on a trusted platform module. The host enforcer 115 executes with the same or higher security and privileges as the labeler 125. The labeler 125 invokes the host enforcer 115 when it detects information flow between two resources that have incompatible labels 200. The host enforcer 115 communicates with the capability database 430 to retrieve the appropriate capabilities, but in some instances, the host enforcer 115 can make a decision without querying the capability database 430. For example, if the sending resource's label 200 cannot be automatically declassified and has one or more secrecy taints 210, and the destination is a removable drive, the host enforcer 115 denies the information flow without checking the capability database 430.

The capability database 130 and label repository 128 are hash tables that allow clients to look up values of keys. Both of these services are implemented using Redis, an exemplary high performance key-value store. Redis supports only string keys, but values can be of any type. Keys for the capability database are the taint identifications 250, and each value is a structure that contains the name for the taint 210 and a list of users and their capabilities over the taint 210.

Implementation: Network Components

A challenge in enforcing information flow control throughout the network 10 is that a receiving host's enforcer 115 may need to make information flow control decisions without having immediate access to the labels 200 associated with the sending resource. To uniquely associate a sending resource with a label 200, the sender's labeler 125 can annotate each packet with a resource identification and a version number. The network enforcer 118 or the enforcer 115 on the receiving host 50 can retrieve the sending resource's label 200 using the sender's IP address, resource identification, and version number from the label repository 128. The resource identification can be unique during a resource's lifetime. Version numbers can increment from zero and indicate the version of the sending process's label 200. If the sending process's label 200 changes, the sender's labeler 125 can annotate subsequent packets with the incremented version number to indicate to the receiving labeler 125 that the sender's label 200 has changed.

During an information flow check, the receiving labeler 125 can extract the resource identification and version number from the packet header for an incoming flow and can retrieve the sender's label 200 from the label repository 128. Because the labeler 125 has local access to the current label 200 for the receiving process, the labeler 125 can perform information flow control checks using the host enforcer 115 at the receiving host 50 in the same, or similar manner, that such checks would be performed for an intra-host information flow check.

The network enforcer 118 can typically reside at boundaries between networks of different trust levels, such as at the edge of the enterprise network 10 leading to the Internet, or between wired and wireless network boundaries within the enterprise. The network enforcer 118 can have policies that designate immutable secrecy and integrity taint sets to certain destination prefixes or to specific ports of the network device. For example, and not limitation, a host enforcer 115 of a sending host 50 can designate traffic destined to the Internet as having a particular immutable taint 210. When a network enforcer 118 sees a new data flow, it can extract the resource identification and version number from the packet header and retrieve the sender's label 200 from the label repository 128. The network enforcer 118 can then perform information flow control checks to ensure that the attempted information flow is permitted. When the network enforcer 118 sees the immutable taint 210 related to Internet traffic, it can determine whether the sending process had any secrecy taints 210 at all. If the sending process had secrecy taints, the network enforcer 118 can prohibit the attempted information flow.

If a flow passes information flow control checks, the network enforcer 118 can install a rule that allows future packets with the same resource identification and version number back into the network 10 without undergoing checks.

Although the network enforcer 118 may be any of various devices capable of inspecting network traffic and corresponding labels from the label repository 128, the prototype security system 100 uses a slightly-modified OpenFlow switch implementation, along with a custom NOX controller that communicates with the switch over a secure channel. The controller queries the capability database 130 and the label repository 128 to make information flow decisions and installs rules on the network switch to forward or block flows based on the decisions. The prototype security system 100 uses modified OpenFlow switches to augment flow table entries with label version numbers. When a new flow arrives, the switch forwards the traffic to the controller, and the network enforcer 118 at the controller performs any necessary information flow control checks. If the information flow is permitted, the controller inserts a flow table entry in the switch, and data packets that match this entry are forwarded without further checks. If the version numbers embedded in the data packets change mid-flow, the flow table entry will no longer match, at which point the controller performs a new information flow check on the new version of the sender's label.

Implementation: Security Features

Although the label repository 128 can contain labels from various hosts 50, a particular labeler 125 can be limited to pushing and manipulating labels 200 in the label repository 128 only for resources that are associated with its host 50. In some embodiments, labelers 125 can be uniquely identifiable so that the security system 100 can associate each labeler 125 with its host 50, even as hosts 50 enter and leave the network 10 or change IP addresses. Thus, an administrator may assign a unique private/public key pair to each labeler 125 when the labeler 125 is installed on the corresponding host 50. The public key can act as an identification for the host 50 and can be used for self-certification. The public key can also be used to generate a session encryption key to encrypt control traffic related to the security system 100.

When a host 50 enters the network 10 and joins the security system 100, its labeler 125 can register with a labeler authentication service. The labeler authentication service can associate each host 50 with its host identification, so the public key for a host 50 can be used to prove the labeler's identity and to securely establish an expirable session key for use between the labeler 125 and enterprise services (e.g., label repository 128, capability database 430, authentication service and taint management console 445). The labeler 125 can interact securely with the label repository 128 to register storage for itself as needed and to push and retrieve labels 200 for inter-host communication.

In some cases, a host 50 may have multiple network interfaces, with only one is connected to the enterprise network (i.e., the "primary" interface). In that case, the labeler 125 can determine the primary interface, so as to denote all other interfaces as potential avenues for data leaks. To discover the primary interface, the host labeler 125 can broadcast a message to all configured interfaces and then designate the interface on which it receives a signed response from the labeler authentication service as the primary network interface.

The security system 100 can fix the taints of certain resources, so as to limit the abilities of such resources. For example, at boot time, the host enforcer 115 can build a list of all output devices (except the display device) as potential avenues for information leaks. The host enforcer can then set an immutable label 200 of these devices, so as to prevent tainted resources from writing to these devices. The primary network interface card and the primary hard disk can be excluded from the devices receiving this label 200. These two devices can instead receive an immutable "master" label 200. The master label 200 can indicate that send(2) and recv(2) through these interfaces do not involve information flow checks or label adjustments.

For example, and not limitation, all electronic messages and external drives, such as flash drives, can receive empty immutable labels 200. Thus, in the attempt of a user to copy a file to a flash drive where the file has any secrecy taints 210, the user may be unable to raise the secrecy of the flash drive so as to enable the information flow. However, if the user has the capability to lower the secrecy of the file with respect to the applicable taints 210, then the user can do so, thus enabling the file to written to the flash drive.

As mentioned above, a user who owns a taint 210 may limit which people have the capability of unsetting the secrecy characteristic 220 of that taint 210. Resultantly, a user may limit which users can transmit data associated with the taint 210 outside of the network 10.

In short, labels 200 can enable users of the security system 100 to protect the flow of their data. By labeling a resource with a particular taint 210, a first user can assert control over the flow of information from that resource. The first user can grant a first set of other users the right to initiate information flows from the resource, and can grant a second set of other users the right to take information from the resource out of the network.

As discussed above in detail, various exemplary embodiments of the present invention can provide an effective means to reduce or prevent data leaks in an enterprise network, by requiring information flows to comply with applied resource labels. While security systems and methods have been disclosed in exemplary forms, many modifications, additions, and deletions may be made without departing from the spirit and scope of the system, method, and their equivalents, as set forth in the following claims.

What is claimed is:

1. A security system for a plurality of resources in a computer network having a plurality of hosts, the security system comprising:
   a computer processor;
   a memory operatively coupled to the computer processor and configured for storing data and instructions;
   a plurality of taints, each taint configured to be applied by a labeling system to at least one of the plurality of resources, and each taint having a plurality of characteristics including identification data, secrecy data, and integrity data, the characteristics variably being in a first state or a second state;
   a plurality of labels, each label comprising at least one taint;
   the labeling system in communication with the plurality of hosts and configured to apply, by the processor, a label of the plurality of labels to a corresponding operating system resource of the plurality of resources, and to receive notifications of attempted writes to the operating system resource, wherein the operating system resource includes one or more of a file, process, socket, thread, or memory page;
   a capability database configured for associating each of a plurality of users with a respective corresponding capability set for each respective taint of the plurality of taints, wherein according to a first capability set of a first user for a first taint, the first user has a capability to change the characteristics of the first taint from the second state to the first state, and from the first state to the second state, in the first label,
   wherein the labeling system is further configured to automatically modify the state of the first label on behalf of the first user, to facilitate the information flow; and
   an enforcement system in communication with the plurality of hosts and configured to block outgoing computer network traffic from each host, responsive to determining the outgoing computer network traffic includes a first resource where at least one taint in a first label of the first resource is in the first state.

2. The security system of claim 1, the enforcement system being configured to block an information flow from the first resource having the first label to a second resource having a second label, responsive to determining the first label comprises a first taint with characteristics in the first state and the second label lacks the first taint with characteristics in the first state.

3. The security system of claim 2, the labeling system applying an immutable label to the second resource, wherein the second resource leads outside the computer network.

4. The security system of claim 2, the enforcement system being configured to block the information flow to the second resource absent content-scanning of the information flow.

5. The security system of claim 2, the enforcement system being configured to determine provenance of the first resource based on the first label having the first taint with characteristics in the first state.

6. The security system of claim 1, wherein according to a second capability set of a second user for the first taint, the second user lacks the capability to change the characteristics of the first taint from the second state to the first state.

7. The security system of claim 1, the plurality of resources comprising a plurality of database entries, wherein the labeling system is configured to apply a corresponding label to each of the plurality of database entries.

8. The security system of claim 7, wherein the computer network is an enterprise network, the enforcement system being further configured to identify login credentials of users who access a database from locations external to the enterprise network, and to selectively allow authorized users to retrieve the database entries from locations external to the enterprise.

9. A security system for a plurality of resources in a computer network having a plurality of hosts, the security system comprising:
   a computer processor;
   a memory operatively coupled to the computer processor and configured for storing data and instructions;
   a plurality of taints, each taint configured to be applied by a labeling system to at least one of the plurality of resources, and each taint having a plurality of characteristics including identification data, secrecy data, and integrity data, the characteristics variably being in a first state or a second state;
   a plurality of labels, each label comprising at least one taint;
   the labeling system in communication with the plurality of hosts and configured to apply, by the processor, a label of the plurality of labels to a corresponding operating system resource of the plurality of resources, and to receive notifications of attempted writes to the operating system resource, wherein the operating system resource includes one or more of a file, process, socket, thread, or memory page;
   a capability database configured for associating each of a plurality of users with a respective corresponding capability set for each respective taint of the plurality of taints, wherein according to a first capability set of a first user for a first taint, the first user has a capability to change the characteristics of the first taint from the second state to the first state, but not from the first state to second state, in the first label,
   wherein the labeling system is further configured to automatically modify the state of the first label on behalf of the first user, to facilitate the information flow; and
   an enforcement system in communication with the plurality of hosts and configured to block outgoing computer network traffic from each host, responsive to determining the outgoing computer network traffic includes a first resource where at least one taint in a first label of the first resource is in the first state.

10. The security system of claim 9, the enforcement system being configured to block an information flow from the first resource having the first label to a second resource having a second label, responsive to determining the first label comprises a first taint with characteristics in the first state and the second label lacks the first taint with characteristics in the first state.

11. The security system of claim 9, the labeling system applying an immutable label to the second resource, wherein the second resource leads outside the computer network.

12. The security system of claim 9, the enforcement system being configured to block the information flow to the second resource absent content-scanning of the information flow.

13. The security system of claim 9, the enforcement system being configured to determine provenance of the first resource based on the first label having the first taint with characteristics in the first state.

14. The security system of claim 9, wherein according to a second capability set of a second user for the first taint, the second user lacks the capability to change the first taint from the second state to the first state.

15. The security system of claim 9, the plurality of resources comprising a plurality of database entries, wherein the labeling system is configured to apply a corresponding label to each of the plurality of database entries.

16. The security system of claim 15, wherein the computer network is an enterprise network, the enforcement system being further configured to identify login credentials of users who access a database from locations external to the enterprise network, and to selectively allow authorized users to retrieve the database entries from locations external to the enterprise.

* * * * *